United States Patent
Viaud

(10) Patent No.: US 6,910,325 B2
(45) Date of Patent: Jun. 28, 2005

(54) BALER

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 30 days.

(21) Appl. No.: 10/723,945

(22) Filed: Nov. 26, 2003

(65) Prior Publication Data

US 2004/0128971 A1 Jul. 8, 2004

(30) Foreign Application Priority Data

Nov. 27, 2002 (DE) .......................... 102 55 175

(51) Int. Cl.⁷ .............................................. A01D 61/00
(52) U.S. Cl. ........................................ 56/341; 100/88
(58) Field of Search ................... 56/364, 341; 100/88

(56) References Cited

U.S. PATENT DOCUMENTS

| | | | | |
|---|---|---|---|---|
| 3,939,631 A | * | 2/1976 | Blanshine ................. | 56/341 |
| 4,205,514 A | * | 6/1980 | Wolrab ................... | 56/341 |
| 5,052,170 A | * | 10/1991 | Trenkamp et al. ......... | 56/341 |
| 5,255,501 A | * | 10/1993 | McWilliams .............. | 56/341 |
| 5,661,961 A | * | 9/1997 | Westhoff et al. ......... | 56/16.4 R |
| 5,848,523 A | * | 12/1998 | Engel et al. ............ | 56/341 |
| 6,279,304 B1 | * | 8/2001 | Anstey et al. ........... | 56/341 |
| 6,385,952 B1 | * | 5/2002 | Bergkamp et al. ......... | 56/341 |
| 6,601,375 B1 | * | 8/2003 | Grahl et al. ............ | 56/16.6 |
| 6,651,418 B1 | * | 11/2003 | McClure et al. .......... | 56/341 |
| 2003/0159421 A1 | * | 8/2003 | Trelstad et al. ......... | 56/341 |
| 2004/0011016 A1 | * | 1/2004 | McClure et al. .......... | 56/341 |

FOREIGN PATENT DOCUMENTS

| | | |
|---|---|---|
| DE | 34 07 255 | 2/1984 |
| DE | 34 07 355 A | 8/1985 |
| DE | 198 06 630 | 2/1998 |
| DE | 198 06 630 A | 8/1999 |
| DE | 201 12 345 U | 11/2001 |
| EP | 0 815 720 | 5/1997 |

* cited by examiner

*Primary Examiner*—Meredith C. Petravick

(57) ABSTRACT

A large round baler is equipped with a plurality of components for delivering crop to an inlet of a baling chamber of a large round baler. These components have a width which is substantially wider than the baling chamber inlet and include a crop take-up device and a crop processing arrangement, such as a cutter head, that receives crop from the crop take-up device. The crop processing arrangement delivers the processed crop to a transverse conveyor, which narrows the stream of crop to the width of the baling chamber inlet.

11 Claims, 3 Drawing Sheets

BALER

FIELD OF THE INVENTION

The invention concerns a baler with a take-up device, crop processing arrangement and transverse conveyor following each other in the direction of flow.

BACKGROUND OF THE INVENTION

Known large round balers and rectangular balers receive the crop to be baled from a take-up device of great width that delivers it to a transverse conveyor, such as a screw conveyor, that conducts it in turn selectively into a cutter head from which it reaches a baling chamber. An example of such a baler is disclosed in DE 198 06 630.

The problem underlying the invention is seen in the fact that the condensed and compressed crop to be baled can bring about jams in the cutter head.

SUMMARY OF THE INVENTION

According to the present invention, there is provided a novel combination of components for use in picking up crop and transporting it to an inlet of a baling chamber.

An object of the invention is to provide a series of components ahead of a baling chamber that are generally equally wide and exceed the width of an indirect or direct inlet to the baling chamber.

In this way, the flow of the crop that must be accommodated by the crop processing arrangement is accepted by the crop take-up device uniformly and in a relatively thin mat, and can be delivered further without any trouble. As soon as the crop is processed, for example, cut, moistened, conditioned or the like, and is combined safely in a mat, it can be delivered further without any problems to the transverse conveyor that conducts it further directly into the baling chamber or a pre-compression chamber.

Although it is known practice (DE 34 07 355) to provide a take-up device, a cutter bed, and a transverse conveyor of the same width; however, in this patent, the component combination is applied to a forage harvester in which the crop condensed in this manner is taken over by a paddle conveyor and conducted further. Up to the compression of the harvested crop in a silo or a wagon, further following components are included that cause additional manufacturing costs.

In a large round baler, the transverse conveyor may be used as a body of revolution to support the rotation of the bale at the circumference of the baling chamber, which is particularly helpful in a large round baler with a baling chamber of variable size.

Regardless of the question whether a rectangular baler or a large round baler is used, since a baler requires a transverse conveyor if its take-up width exceeds the width of the baling chamber, but does not necessarily require an intermediate conveyor, a prepared interface has the advantage that the manufacturer needs to offer only one basic model of a baler that can be coupled selectively with a take-up device or to a take-up device with a conveyor.

Although a transverse conveyor can be configured in a multitude of ways, for example, with a rotor rotating about a generally vertical axis; but it is simpler and more cost effective to use screw conveyors or stub screw conveyors that are oriented along an axis perpendicular to the direction of the flow of crop. This orientation also corresponds to that of the take-up device and the conveyor, so that the drive can be performed over gears, sprockets, belt pulleys, etc., located in a single plane.

If part of the transverse conveyor projecting beyond the baling chamber, for example, the screw conveyor, is not supported in bearings, free to rotate on the same axis as the remainder of the transverse conveyor, but is located, free to rotate, about an axis offset from this, the supply into the baling chamber can better conform to the technical and special requirements.

If the projecting sections or if the projection is located only on one side, this section is driven slower or faster than the remainder so that the flow of the crop to the baling chamber can be improved.

An overshot or an undershot drive of the transverse conveyor is selected for a large round baler, depending upon the direction of rotation of the cylindrical bale, in such a way that the charging of the crop to be baled into the baling chamber is performed with the least amount of trouble. The selection of the overshot or undershot direction of rotation in the conveying arrangement depends on the question whether a compression of the crop during transportation is desired or not.

If the interface between the take-up device or the conveying arrangement and the transverse conveyor is configured so as to be pivoted vertically, the transverse conveyor can always remain at the same location, while the take-up device, and if necessary, the conveying arrangement can conform to irregularities of the ground. Thereby, the supply performance of the transverse conveyor to the baling chamber remains constant and can be optimized.

Drivers on the section of the transverse conveyor facing the baling chamber have the advantage that they actively support the conveying of the crop to be baled into the baling chamber, and if necessary, also support the rotation of a cylindrical bale in a large round baler. These drivers may be configured as rails, fingers, tines bridges, etc., that are arranged rigidly or so as to retract and project in or on a rotor.

In particular, the configuration of the crop processing arrangement as cutter head, squeezing device, moistening arrangement or analysis arrangement brings about considerable advantages, since there a thin, uniform mat contributes significantly to the success of the cut, steaming of the dry alfalfa, squeezing of closed stalks to accelerate the drying process or the measurement of the condition of the crop or its contents.

If the conveyor arrangement is configured as a cutter head and its knives can be brought selectively into a non-operating position, it is possible to conduct the crop to be baled into the baling chamber in a cut condition as well as uncut or only partially cut.

BRIEF DESCRIPTION OF THE DRAWINGS

The drawing discloses an embodiment of the invention that shall be described in greater detail in the following.

DESCRIPTION OF THE PREFERRED EMBODIMENT

Figure 1:
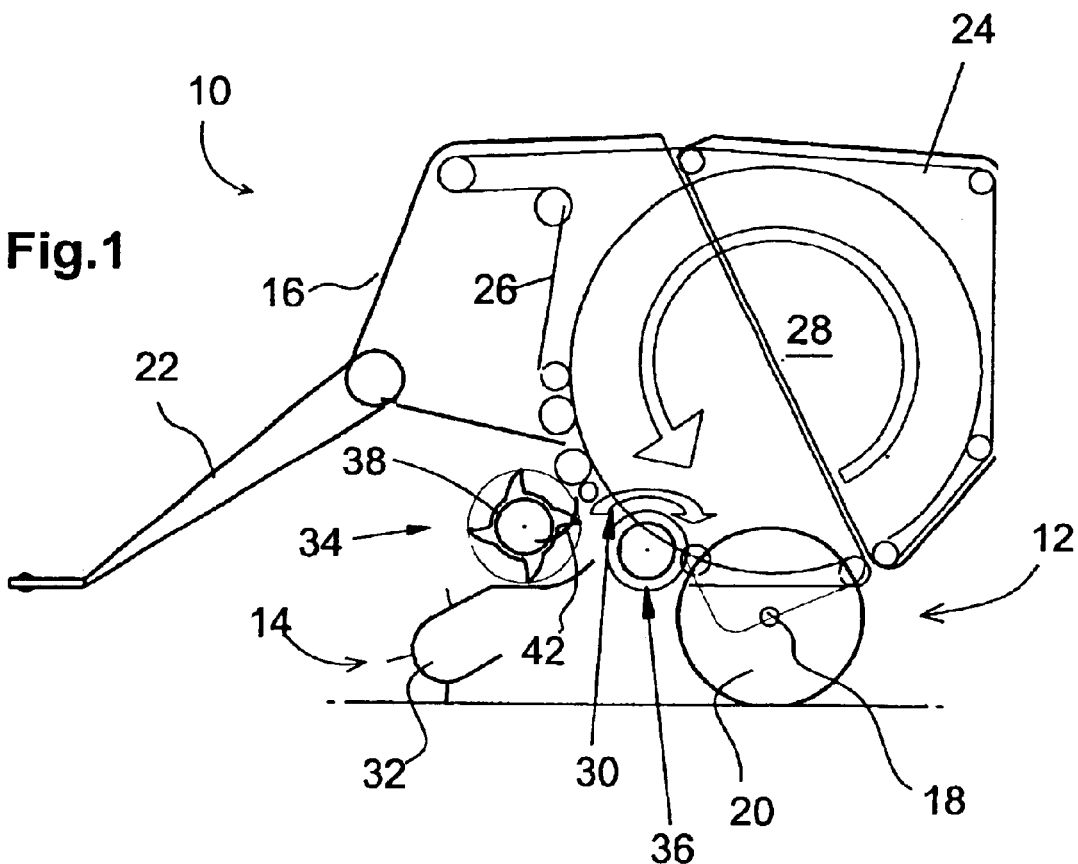
FIG. 1 shows a schematic, left side view of a large round baler constructed in accordance with the invention, wherein a transverse conveyor operates in an overshot manner.
Figure 2:
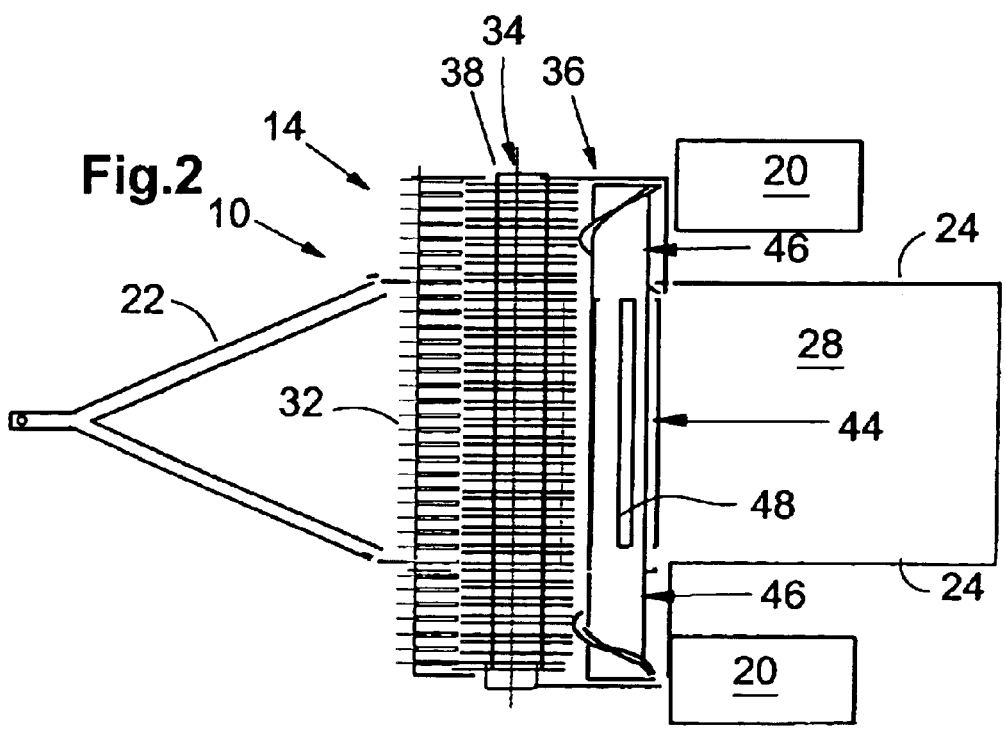
FIG. 2 is a plan view of the baler of FIG. 1.
Figure 3:
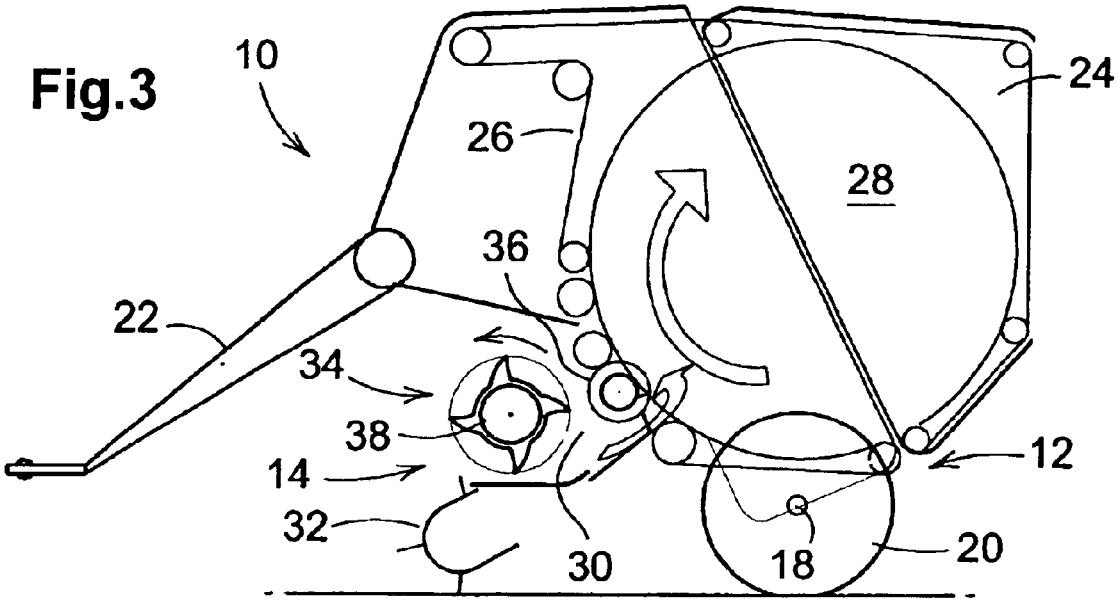
FIG. 3 is a schematic, left side view of a large round baler constructed in accordance with a second embodiment of the present invention, wherein a transverse conveyor operates in an undershot manner.
Figure 4:
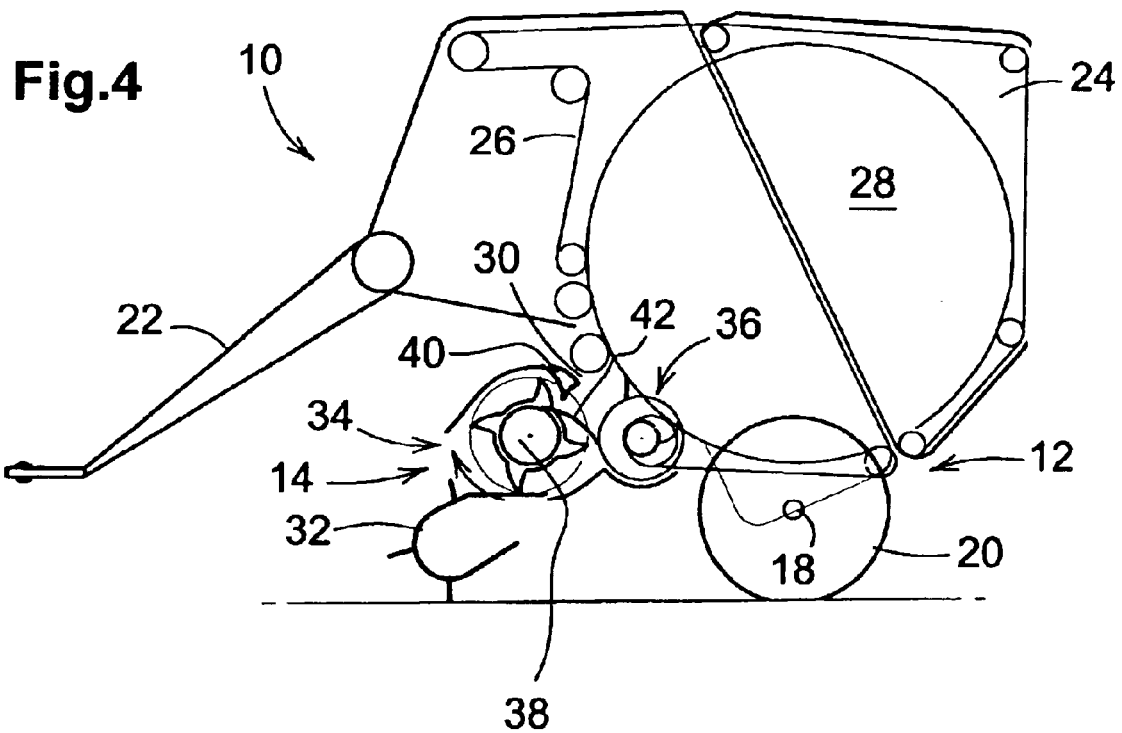
FIG. 4 is a schematic, left side view of a large round baler constructed in accordance with a third embodiment of the invention.
Figure 5:
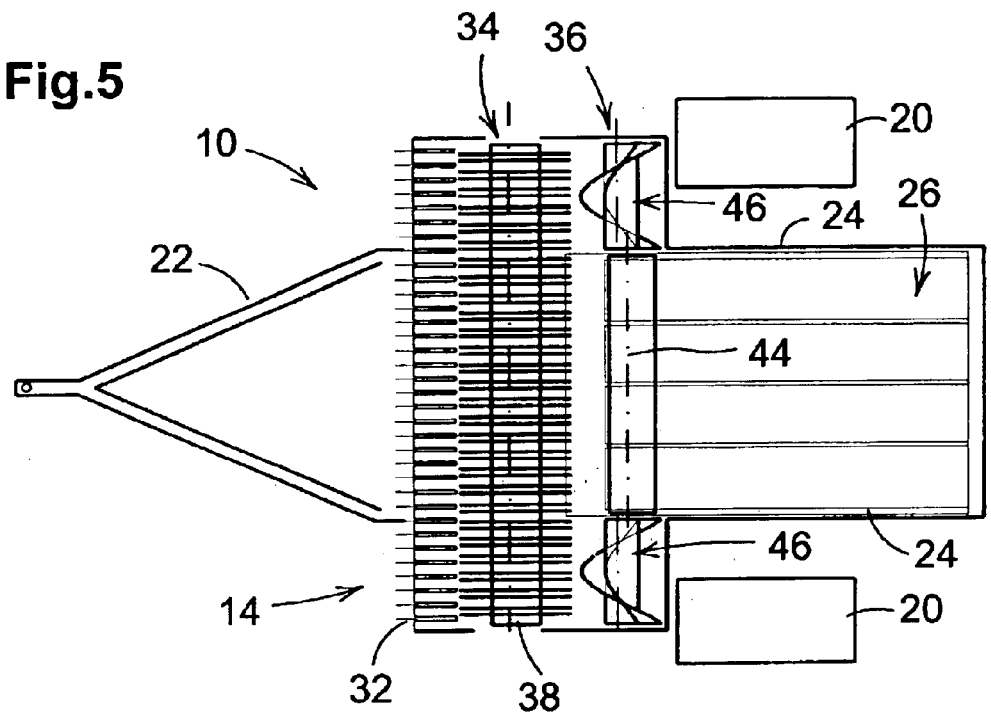
FIG. 5 is a plan view of the baler shown in FIG. 4.

Referring now to FIG. 1, there is shown a baler 10 having a chassis 12 and a crop supply assembly 14. The baler 10 is configured as a large round baler, which however, is not mandatory. Rather, the baler could be configured as a rectangular baler for producing large parallelepiped bales. The baler 10 is applied on the field and takes up crop deposited on the ground in wide swaths, in order to subject it to a baling process. In the case of a large round baler, a configuration with a baling chamber of fixed size as well as a chamber of variable size can be considered.

The chassis 12 includes a frame 16, an axle 18 with wheels 20, a towbar 22, side walls 24 and a baling arrangement 26. The frame 16 is typical in that it consists of the principal components that are bolted or welded together for carrying the aforementioned components. The axle 18 forms the connection between the wheels 20 and the frame 16 and can be attached or configured as spring-supported or rigidly. The wheels support the frame 16 on the ground so that it can move freely and be drawn across the field by the tow bar 22 due to its connection with a towing vehicle. The side walls 24 are spaced away from each other by the width of, and define opposite sides of, the baling chamber 28.

The baling arrangement 26 may consist of belts, pulleys, bar chains or the like, and is used to take up the crop to be baled and conducted in the baling chamber 28 and to compress it. In the case of a rectangular baler, the baling arrangement would be formed by a piston guided in a housing. An inlet 30 into the baling chamber 28 is provided at the forward lower end region of the baling arrangement 26. In a rectangular baler, the inlet into the baling chamber could be formed by a preceding pre-compression mechanism.

The supply assembly 14 is composed of components that are located upstream of the inlet 30, in particular the take-up device 32, basically the crop processing arrangement 34 and the transverse conveyor 36. These components are at least generally equally wide and configured remarkably wider than the baling chamber 28.

The take-up device 32 is generally characterized as a pick-up and is provided with tines or the like that raise the crop to be baled from the ground and deliver it to the rear to the crop processing arrangement 34.

The crop processing arrangement 34 is equipped with a rotor 38 and may be configured as a pure conveyor as well as a cutting device. In the latter case, knives 40 and strippers 42 are provided that engage in the circumferential circle of the rotor 38. The knives 40 can be brought individually or together, if necessary, into various cutting positions and into a non-operating position. If the processing arrangement 34 is used, it forms a configuration unit with the take-up device 32 that can be pre-positioned in height, controlled with it or uncontrolled. The drive of the rotor 38 may be configured in an overshot as well as in an undershot manner, where the position of the knives 40 and the strippers 42 must be made to conform correspondingly.

The downstream side of the take-up device 32 or the processing arrangement 34 form an interface 50 (see FIG. 6), not described in any further detail, that may provide, for example, flange connections, hooks, snap closures or the like.

The transverse conveyor 36 is composed at least structurally of a first section 44 that is associated with the baling chamber 28 and is normally central and operating tangentially, and at least one second section 46 arranged to opposite sides of the central section 44 and operating so as to convey crop axially inward in the transverse direction. If the take-up device 32 and the conveyor 36 only project beyond one side of the baling chamber, then only one second section 46 need be present.

The first section 44 of the transverse conveyor 36 projects into or towards the circumferential region of the baling chamber 28 and operates there upon the crop to be baled, for example, it supports the cylindrical bale in its rotational movement. For this purpose, the first section 44 is equipped with drivers 48 whose form and aggressiveness conforms to the crop to be baled and the baling conditions. Normally, these drivers 48 are rails or bridges that extend axially and are bolted to the circumferential surface of the cylindrical core of the conveyor 36. This first section corresponds more or less to the width of the baling chamber 28 and is driven to correspond in direction and rotational speed with the baling arrangement 26.

The second section or sections 46 may be arranged on an axis, fixed against rotation, with the first section 44 or may be released from this offset and/or driven separately. An outstanding configuration has been shown to be that in the form of screw conveyors. The second section or sections 46 may also be configured so as to operate in an undershot or an overshot manner which is a function of the question whether the crop to be baled can be subjected to a compression or not and in which direction a cylindrical bale rotates. In the case of a rectangular baler, the special arrangement to a pre-compression channel can provide the definition on the undershot or overshot conveying.

Figure 6:
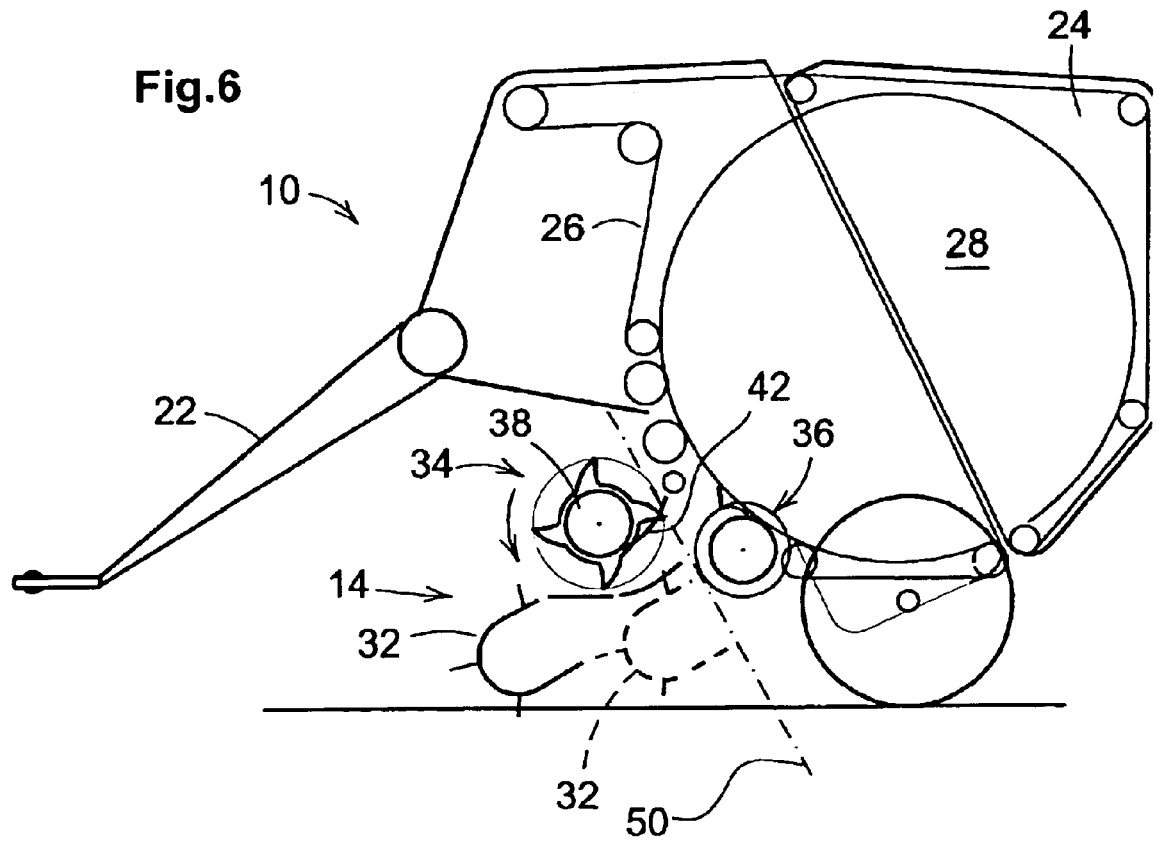
FIG. 6 is a schematic, left side view of a large round baler constructed in accordance with a fourth embodiment of the invention, wherein a transverse conveyor operates in an overshot manner and a crop processing arrangement is used selectively operating in an undershot manner.

According to FIG. 6, in one case, the take-up device 32 can be used upstream of the transverse conveyor 36, as shown in phantom or in another case, the take-up device 32 can be used together with a rotor 38 of the processing arrangement 34. In the latter case, the take-up device 32 and the processing arrangement 34 are connected to each other and mounted to the baler 10 at the interface 50, this connection being, for example, by bolting or by plugging in, etc. In this way, the baler 10 can be manufactured with a base version that is equipped with only the take-up device 32 for an application with straw or stalk-like crop, and is equipped with the take-up device 32 and the crop processing arrangement 34 for an application in silage. Thereby, the transverse conveyor 36 always remains on the baling chamber 28, so that its supply characteristic remains unchanged.

Having described the preferred embodiment, it will become apparent that various modifications can be made without departing from the scope of the invention as defined in the accompanying claims.

What is claimed is:

1. In combination with a baler including a baling chamber having an inlet, a crop delivery arrangement for picking up crop and transporting it to the baling chamber, comprising: a crop take-up device for taking up crop and delivering it in a rearward direction; a crop processing arrangement located for receiving the crop from the crop take-up device and for delivering the crop in said rearward direction, a transverse conveyor located for receiving the crop from the crop processing arrangement and delivering the crop into said inlet; and said crop take-up device, crop processing arrangement, and transverse conveyor all being generally equally wide and being considerably wider than said inlet.

2. The combination, as defined in claim 1, wherein said transverse conveyor includes an inner section that extends along a section of said inlet.

3. The combination, as defined in claim 1 wherein a mechanical interface is provided between said crop processing arrangement and said transverse conveyor, whereby said crop processing arrangement may be separated from said baler at said interface.

4. The combination, as defined in claim 1, wherein said transverse conveyor includes at least one end section configured as a screw conveyor.

5. The combination, as defined in claim 4, wherein said transverse conveyor includes an inner section having a width substantially equal to that of said inlet; and said one end section and inner section of said transverse conveyor being arranged on parallel axes.

6. The combination, as defined in claim 1, wherein said transverse conveyor includes an inner section having a width substantially equal to that of said inlet and at least one end section; and said end section and said inner section of said transverse conveyor being mounted for being separately driven.

7. The combination, as defined in claim 1, wherein each of said crop processing arrangement and said transverse conveyor may be driven so as to deliver crop one of either in an undershot or an overshot manner.

8. The combination, as defined in claim 2, wherein said inner section of said transverse conveyor is equipped with drivers located about its circumference.

9. The combination, as defined in claim 1, wherein said crop processing arrangement is configured as one of a cutter head, squeezing arrangement, moisturizing arrangement or analysis arrangement.

10. The combination, as defined in claim 9, wherein said crop processing arrangement is a cutter head having a plurality of knives mounted for movement between operating and non-operating positions.

11. The combination, as defined in claim 2, wherein said baler is a large round baler; and said inner section of said transverse conveyor projecting through said inlet into a circumferential region of said baling chamber; and at least said inner section of said transverse conveyor being driven in a direction opposite to that of a bale being formed in the baling chamber so that the rotation of at least said inner section of said transverse conveyor will aid the rotation of the forming bale.

* * * * *